(12) United States Patent
Letzelter et al.

(10) Patent No.: US 9,472,024 B2
(45) Date of Patent: Oct. 18, 2016

(54) COMPUTER-IMPLEMENTED METHOD FOR DESIGNING A THREE-DIMENSIONAL MODELED OBJECT

(71) Applicant: Dassault Systemes, Velizy Villacoublay (FR)

(72) Inventors: Frederic Letzelter, Longjumeau3 (FR); Laura Peythieux, Boulogne Billancourt (FR); Mathieu Gunther, Le Chesnay (FR); Amelie Renard, Issy les Moulineaux (FR)

(73) Assignee: Dassault Systemes, Velizy Villacoublay (FR)

( * ) Notice: Subject to any disclaimer, the term of this patent is extended or adjusted under 35 U.S.C. 154(b) by 0 days.

(21) Appl. No.: 14/569,509

(22) Filed: Dec. 12, 2014

(65) Prior Publication Data
US 2015/0178991 A1    Jun. 25, 2015

(30) Foreign Application Priority Data

Dec. 20, 2013   (EP) .................................... 13306323

(51) Int. Cl.
| | | |
|---|---|---|
| *G06T 19/00* | (2011.01) | |
| *G06T 15/08* | (2011.01) | |
| *G06F 3/0482* | (2013.01) | |
| *G06F 3/0483* | (2013.01) | |
| *G06F 3/0484* | (2013.01) | |
| *G06F 3/0486* | (2013.01) | |

(52) U.S. Cl.
CPC ........... *G06T 19/006* (2013.01); *G06F 3/0482* (2013.01); *G06F 3/0483* (2013.01); *G06F 3/0486* (2013.01); *G06F 3/04845* (2013.01); *G06T 15/08* (2013.01); *G06F 2203/04803* (2013.01); *G06T 2219/20* (2013.01)

(58) Field of Classification Search
None
See application file for complete search history.

(56) References Cited

U.S. PATENT DOCUMENTS

| | | | |
|---|---|---|---|
| 2007/0070066 A1* | 3/2007 | Bakhash | G06F 3/04815 345/419 |
| 2010/0083111 A1 | 4/2010 | De Los Reyes | |
| 2010/0153844 A1 | 6/2010 | Hwang et al. | |
| 2011/0246875 A1 | 10/2011 | Parker | |
| 2011/0292438 A1 | 12/2011 | Inami | |
| 2013/0069860 A1 | 3/2013 | Davidson | |

FOREIGN PATENT DOCUMENTS

EP    2 490 113    8/2012

OTHER PUBLICATIONS

European Search Report for 13306823.9 dated May 9, 2014.

* cited by examiner

*Primary Examiner* — Said Broome
(74) *Attorney, Agent, or Firm* — Hamilton, Brook, Smith & Reynolds, P.C.

(57) ABSTRACT

A computer-implemented method for designing a three-dimensional modeled object comprising the steps of providing a three-dimensional designing scene (41) in a display screen (40); and providing a graphical tool (42) in a first area (43) with a reduced size in the display area (44) of the screen (40) comprising at least one image (45, 46, 47). The graphical tool (42) is permanently superimposed over the scene (41).

19 Claims, 13 Drawing Sheets

COMPUTER-IMPLEMENTED METHOD FOR DESIGNING A THREE-DIMENSIONAL MODELED OBJECT

RELATED APPLICATION

This application claims priority under 35 U.S.C. §119 or 365 to European Application No. 13306823.9, filed Dec. 20, 2013. The entire teachings of the above application(s) are incorporated herein by reference.

TECHNICAL FIELD OF THE INVENTION

The invention relates to the field of computers programs and systems, and more specifically to the field of computer-implemented method for displaying a three-dimensional modeled assembly in a scene, or, in other words for manipulating three-dimensional modeled objects of an assembly in a three-dimensional scene.

BACKGROUND OF THE INVENTION

Images are necessary in numerous fields. They can be used as two-dimensional references, to give ideas to a product designer, to serve as model or to help children learning how to draw.

Figure 1:
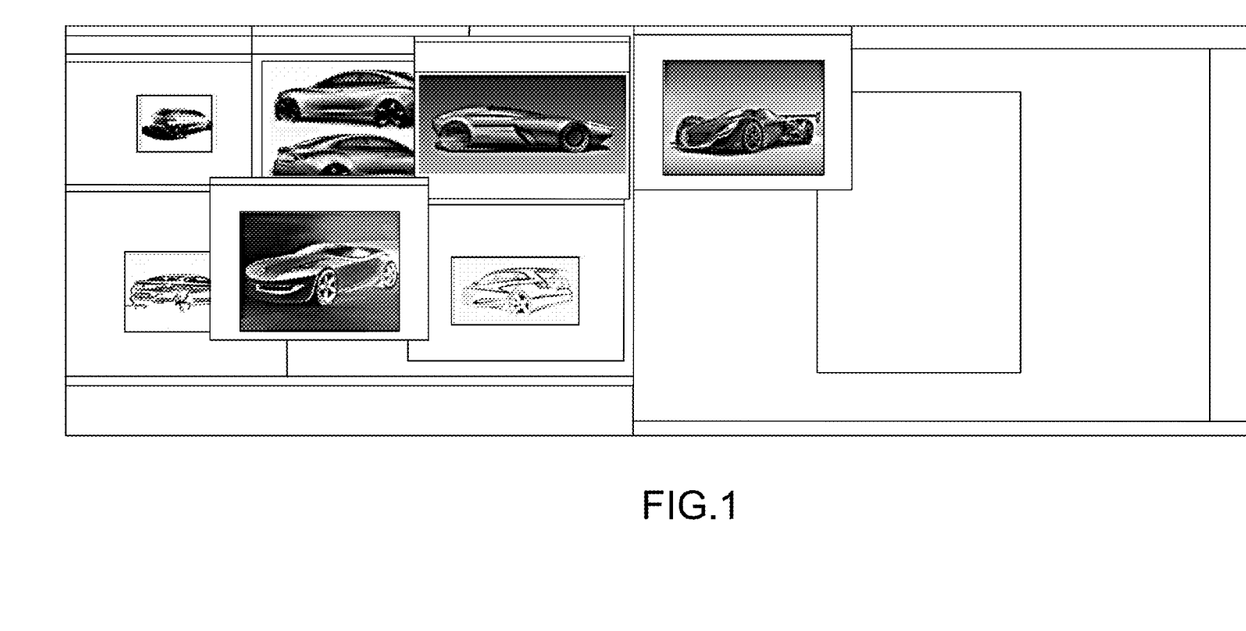
FIGS. 1 to 3 illustrate a computer-implemented method for designing a three-dimensional modeled object, according to the state of the art.

Indeed, many people need to have images in their range of vision to create, and they mostly split their screen in two parts, or, for the luckiest, use two screens: one with the creation software and the other with the reference(s). As represented on FIG. 1, the desktop can be cluttered of images, and that is not convenient.

Figure 2:
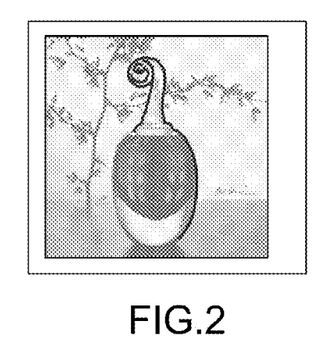

But this is not the only need the user can have about images. They can also be used as supports in 2D or 3D software to draw on it, as illustrated on FIG. 2, like using transfer paper. They can also be snapped on a 3D object to texture it, or used as input to create a logo. Images in creation context are as important as references.

Figure 3:
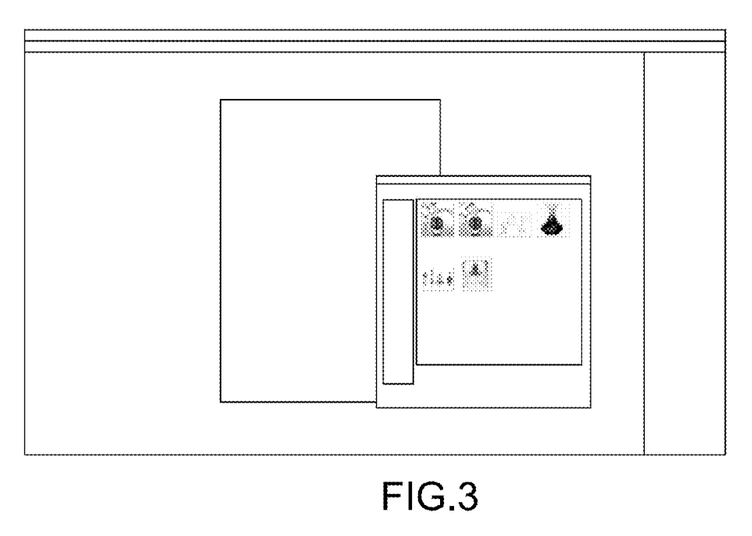

Their insertion in the software is often managed by a file chooser, as illustrated on FIG. 3, or by drag and drop from a file explorer.

SUMMARY OF THE INVENTION

The present invention can belong to any field of technology using images as supports or references (sketching, modeling, review, CAD . . . ). In our case, the product that uses it belongs to CAD field. CAD stands for Computer-Aided Design.

For example, the present invention can be implemented in the software solution provided by Dassault Systèmes under the trademark CATIA Ideas Sketch.

Some drawbacks appear in the solutions described above.

First, concerning the references, splitting a desktop or having several screens raised some problems such as how will the user read his emails if he needs, without acquiring another screen.

Furthermore, it is very tiring for the eyes and the brain to always go from one side to another.

Moreover, that is impossible on the "one process" devices such as tablets or smartphones.

Furthermore, it is very hard work to organize the space.

An aim of the invention is to find a more productive solution to handle such an important functionality as are reference images, and particularly for creative designers when they are sketching an industrial product, prior to modeling design.

For images on context, the solution of drag and drop from a file explorer is not usable with "one process" devices and the file chooser solution makes hard the positioning of the file in a 3D software.

For images on context, the solution of drag and drop from a file explorer is not usable using "one process" devices and the file chooser solution makes hard the positioning of the file in a 3D software for instance. The problem is also for importing several images.

Thus, an aim of the invention is to think about people who are willing to use these two functionalities for images in the same time: this is not possible currently to switch easily from one to another, above all in a mobile device or in a one screen desktop.

An aim of the invention is to provide a computer-implemented method and a system to overcome the above mentioned problems.

It is proposed, according to one aspect of the invention, a computer-implemented method for designing a three-dimensional modeled object comprising the steps of:

providing a three-dimensional designing scene in a display screen; and providing a graphical tool in a first area with a reduced size in the display area of the screen comprising at least one image, the graphical tool being permanently superimposed over the scene.

Such a method allows to the user to easily watch images he wants to see, while he makes creation, like creative designers for sketching.

The modeled object is related to a physical product to be manufactured in the real world subsequent to the completion of its virtual design with a CAD solution. This physical product may be an industrial product such as a mechanical product, for instance a mechanical part but not limited to. A CAD solution allows the design of products in various and unlimited industrial fields: aerospace, architecture, construction, consumer goods, high-tech devices, industrial equipment, transportation, marine, offshore or transportation.

According to an embodiment, said reduced size of the first area represents less than a quarter of the display area of the screen.

Thus, the most area of the screen can be used for the design.

According to an embodiment, said reduced size of the first area represents a sixth of the display area of the screen.

This is an embodiment particularly practical, because the graphical tool doesn't interfere with the use of the scene.

According to an embodiment, images are arranged in a stack.

A stack thus allows a compact arrangement that minimize the space occupied by the images and thus addresses drawbacks related to limited available screen surface, for instance with small screen devices such as a smartphone or a tablet.

Alternatively, the graphical tool comprises a number of images inferior or equal to a threshold, images are partially superimposed such that there is no loss of more than 20% of each image, and for example in a messy arrangement.

Thus, several images can be simultaneously displayed in the graphical tool.

According to an embodiment, the graphical tool is extended in a second area being an horizontal banner in the display area, comprising the first area.

Thus several images can be displayed separately in the horizontal banner.

Alternatively, the graphical tool is extended in a third area being a vertical banner in the display area, comprising the first area.

Thus several images can be displayed separately in the vertical banner.

For example, images are scrolled in the banner.

This is particularly interesting and easy to see completely several images simultaneously.

An image can be scaled, rotated, or translated in the graphical tool.

Furthermore, an image can be added or deleted in the graphical tool.

Thus the graphical tool is easily configurable.

According to an embodiment, an image of the graphical tool is imported in the scene, or an image of the scene is exported in the graphical tool.

An importation in the scene of an image of the graphical tool being effected with a drag and drop of the image, a drop can't be taken into account when made inside a wide security area comprising the current area of the graphical tool.

During the drag in the scene, outside the wide security area, a representation of the imported image can be represented in partial transparency at the current position of the drag.

At the end of the drag, at the drop position, the image can be created in the scene at the drop position.

It is also proposed, according to another aspect of the invention, a computer-readable medium having computer-executable instructions to perform the method for designing a three-dimensional modeled object as described above.

It is also proposed, according to another aspect of the invention, a computer program product, stored on a computer readable medium, for displaying a three-dimensional modeled assembly in a scene, comprising code means for causing the system to take the steps of the method as described above.

It is also proposed, according to another aspect of the invention, an apparatus for designing a three-dimensional modeled object comprising means for implementing the steps of the method as described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention will be better understood with the study of some embodiments described by way of non-limiting examples and illustrated by the accompanying drawings wherein.

DETAILED DESCRIPTION OF THE INVENTION

A description of example embodiments of the invention follows.

The teachings of all patents, published applications and references cited herein are incorporated by reference in their entirety.

Following figures explain more in details the functioning of the present invention.

In the present description, a three-dimensional model object is an object represented in 3D, i.e. with a representation, based on data, for displaying an object in any perspective in a 3D scene.

A 3D modeled object can be, for example, a physical product, an industrial product, or a mechanical object (to be produced or manufactured).

Figure 4:
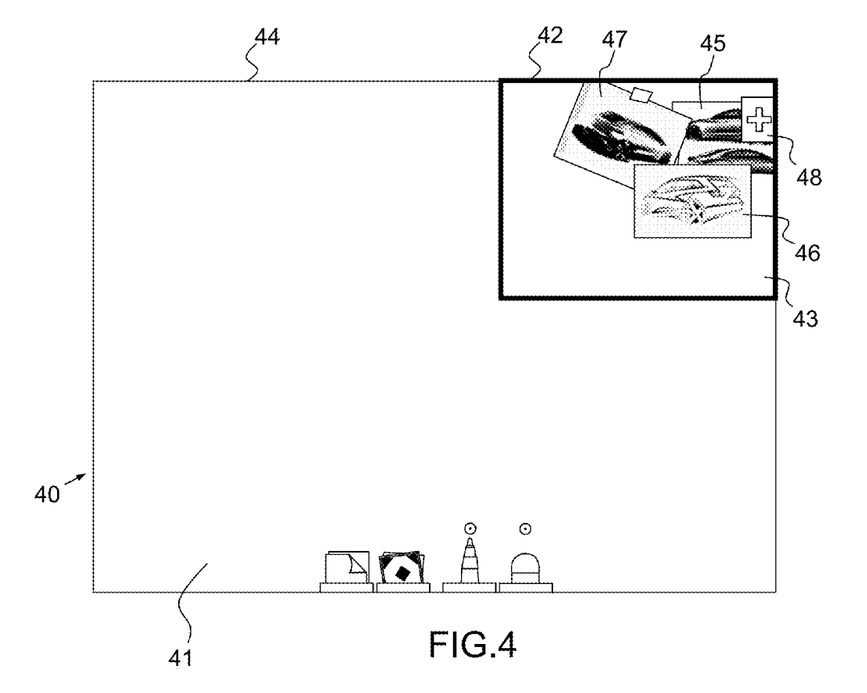
FIGS. 4 to 16 illustrate a computer-implemented method for designing a three-dimensional modeled object, according to an aspect of the invention.

FIG. 4 represents a computer-implemented method for designing a three-dimensional modeled object, according to an aspect of the invention.

On the screen 40, is provided a designing scene 41, and a graphical tool 42, or, in other words an image widget, in a first area 43 with a reduced size in the display area 44 of the screen 40 comprising at least one image, in the present case three images 45, 46, 47, the graphical tool 42 being permanently superimposed over the scene 41. Of course, it is also possible to have no image in the graphical tool 42, and thus only the button to import an image would be present in the graphical tool 42.

The reduced size of the first area 43 represents less than a quarter of the display area 44 of the screen 40, and preferably a sixth of the display area 44 of the screen 40. Thus, the most area of the display area 44 of the screen 40 can be used for the design.

As illustrated on FIG. 4, a tool embedded in the 3D sketching space 44 that deals with both references and support images 45, 46, 47.

The user is able to import some images 45, 46, 47; the positioning of images 45, 46, 47 is optimized to allow the user to see his references without encroaching too much upon creation space. So, if less than three images are in the graphical tool 42, they are positioned so that the user can see all the images at the same time. But if there are more than three images, they are placed in a stack where the user can navigate to find the current reference he wants to see.

This is the default behavior, but it is also possible to see all references: this graphical tool 42 is able to turn into a banner showing all images of the stack either horizontally or vertically.

The graphical tool 42 comprises a number of images inferior or equal to a threshold, in the present example 3, images 45, 46, 47, are partially superimposed such that there is no loss of more than 20% of each image. For example, images are messy arranged, or, in other words not aligned.

Figure 5:
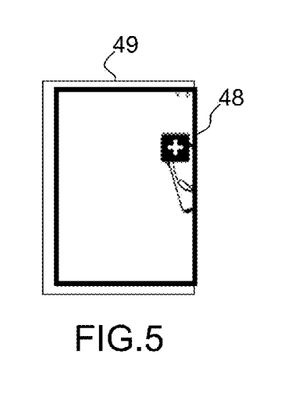

The first need for both functionalities is importing images. User has two ways to do that: clicking on a "plus" button 48 which opens a file chooser wherein the user can choose the image(s) he wants to import, or dragging and dropping an image (from web browser, file explorer . . . ) around the "plus" button, as illustrated on FIG. 5.

To represent an imported image in the graphical tool 42, it is not created at its original size (in case of a big image). This is defined a "maximal image size" (represented by the grey area 49 on FIG. 5) computed also from a percentage of the screen. The image is scaled to fit this max size, keeping its ratio.

Figure 6A:
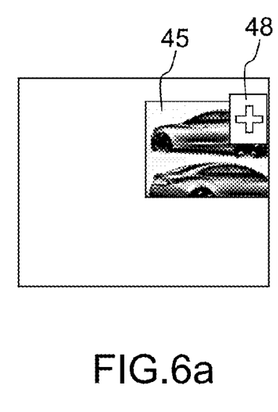
Figure 6B:
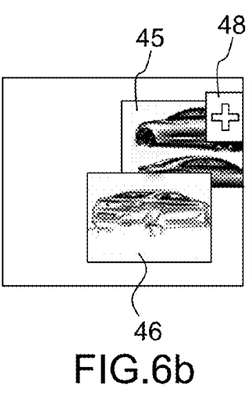
Figure 6C:
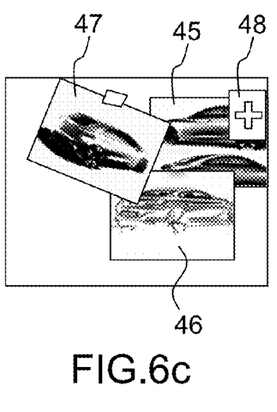

Whatever the solution used to import an image, the three first added images are positioned as illustrated on FIGS. 6a, 6b and 6c, in a messy arrangement. The threshold can be equal to three images, so the messy arrangement is done until three images in the graphical tool 42.

Figure 7A:
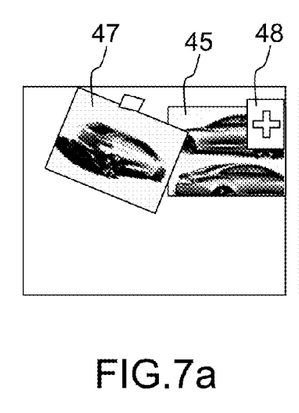
Figure 7B:
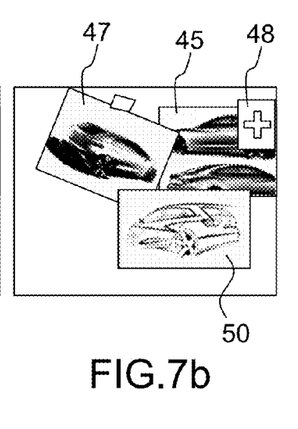
Figure 9A:
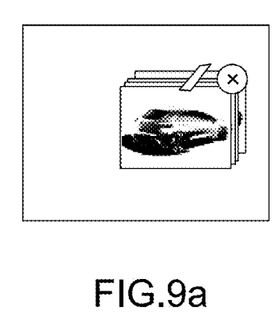
Figure 9B:
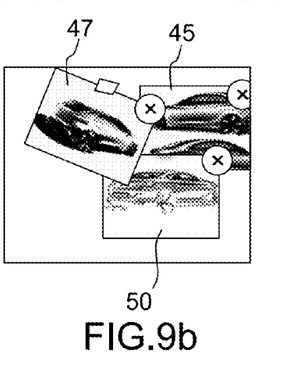

If the user suppresses an image, in this case image 46, for example with a long hold in any image which launches the suppression mode, as illustrated on FIGS. 9a and 9b, and adds a new one 50, it takes the first free area, as illustrated on FIGS. 7a and 7b.

Anyway, the last image is always on the top of the stack.

As illustrated, the messy stack, has an optimal positioning that provides the user a good vision of each image without taking too much space in the creation viewer.

The rotation of the images is important for vision and scene design, giving the "messy" look of a desktop and allowing to see each of the stack's image at the same time.

Figures 8A, 8B, 8C:
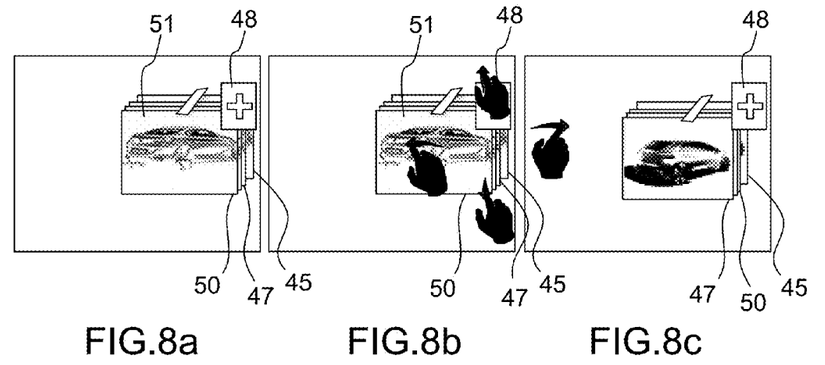

If a fourth image is imported, the messy stack becomes a classical stack, because of the threshold equal to three images in the present example, as illustrated on FIGS. 8a and 8b.

It is possible to navigate into this stack by clicking on the top, or dragging the first image, by staying in the wide security area as illustrated on FIG. 8c. This way, the user can either tap to change the current image, or do a little drag, like a browse in a book. Obviously, it works either with the finger, the mouse or the pen. Thus, it is possible to scroll the images as images in a circular queue or circular FIFO, during a change of the current image, the first image of the stack becomes the last image of the stack and is replaced by the second image of the stack.

Examples are given above and below with single touch gestures, but it also works with multi-touch interaction. For example a "drag" can be a drag with several fingers.

In both representations (messy and stack), it is possible to suppress one or several images. A long hold in any image launches the suppression mode, as illustrated on FIGS. 9a and 9b, wherein a long hold is made on image 50 which is thus put in front of others images of the graphical tool 42.

The user only has to click on a cross to delete the corresponding image. He can also navigate in the stack as previously to choose the image he wants to delete.

Figure 10:
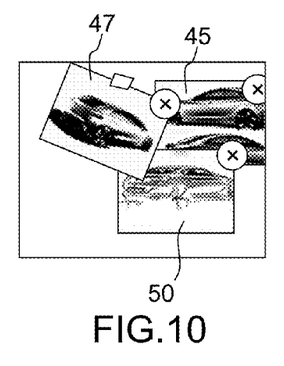

If the user deletes so many images that their number reaches the threshold, in this case three, the stack becomes again a messy stack, as illustrated on FIG. 10.

An interaction (drag, click, tap . . . ) anywhere else on the screen quits the suppression mode.

But messy and classical stack view modes are not the only available representations. It is possible to switch to new ones doing a horizontal or vertical drag on any of previous views. The images are then put in a banner.

Figure 11A:
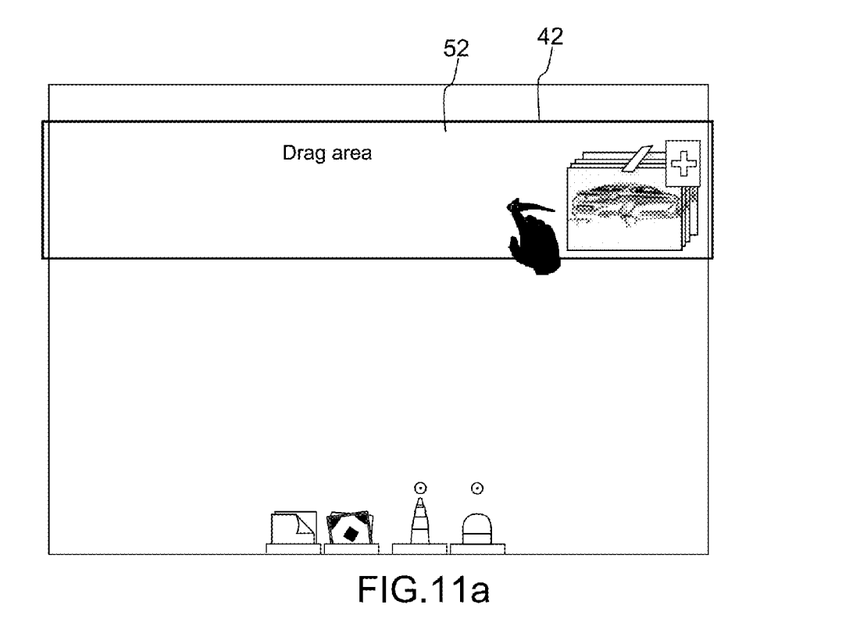
Figure 11B:
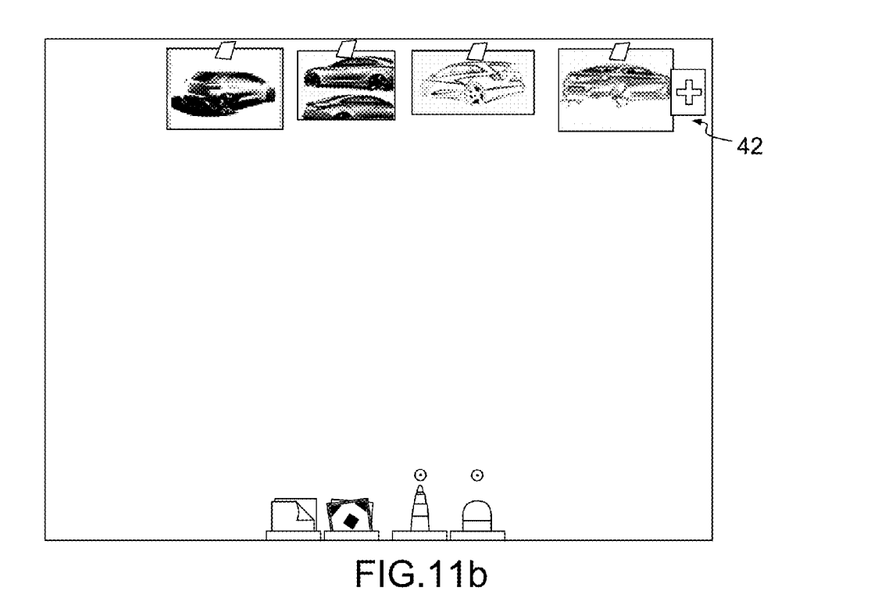

On FIGS. 11a and 11b is represented an example wherein the graphical tool 42 is extended in a second area 52 being an horizontal banner.

Figure 11C:
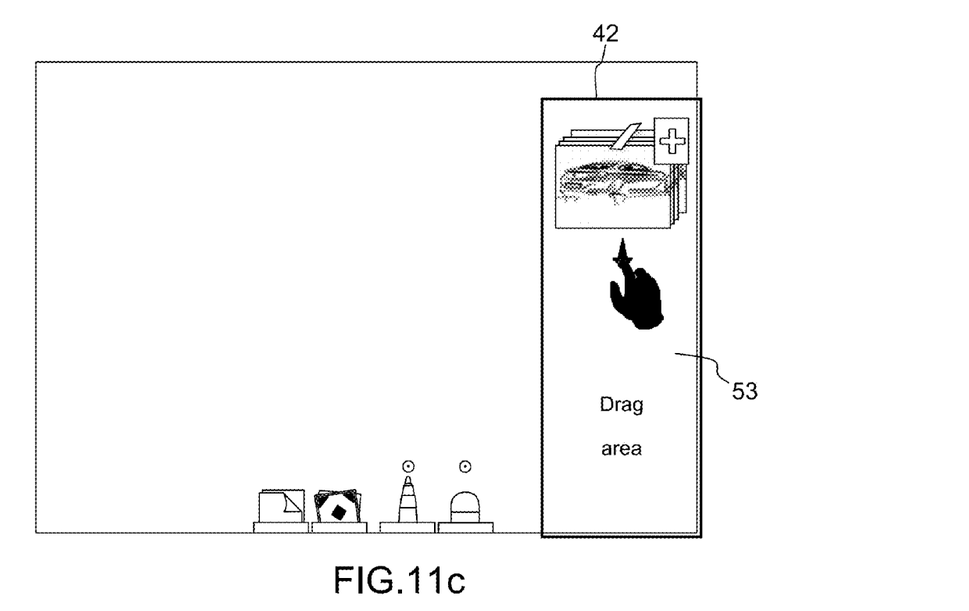
Figure 11D:
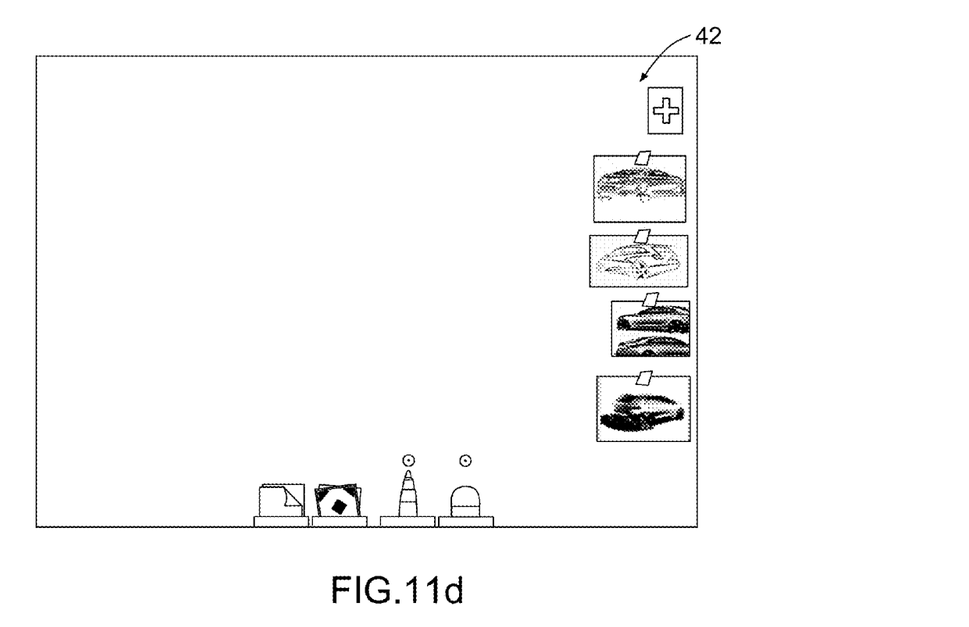

On FIGS. 11c and 11d is represented an example wherein the graphical tool 42 is extended in a third area 53 being a vertical banner.

The second area 52 and the third area 53 comprises the first area 43.

Figure 12:
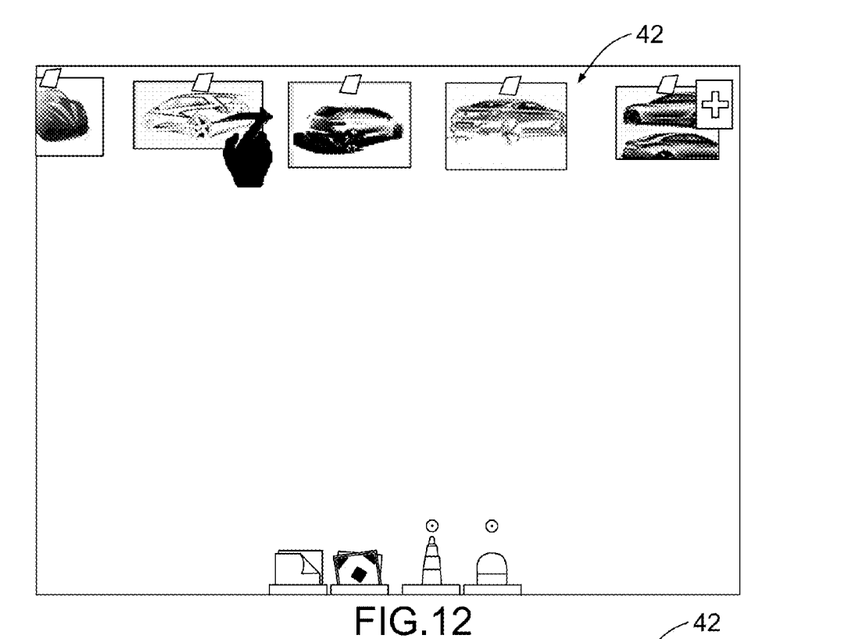

As illustrated on FIG. 12, If there are too many images to fit in the second 52 or third area 53, the area becomes scrollable so that the user can navigate through as many references as he needs. He just has to scroll to access the invisible objects.

Figure 13A:
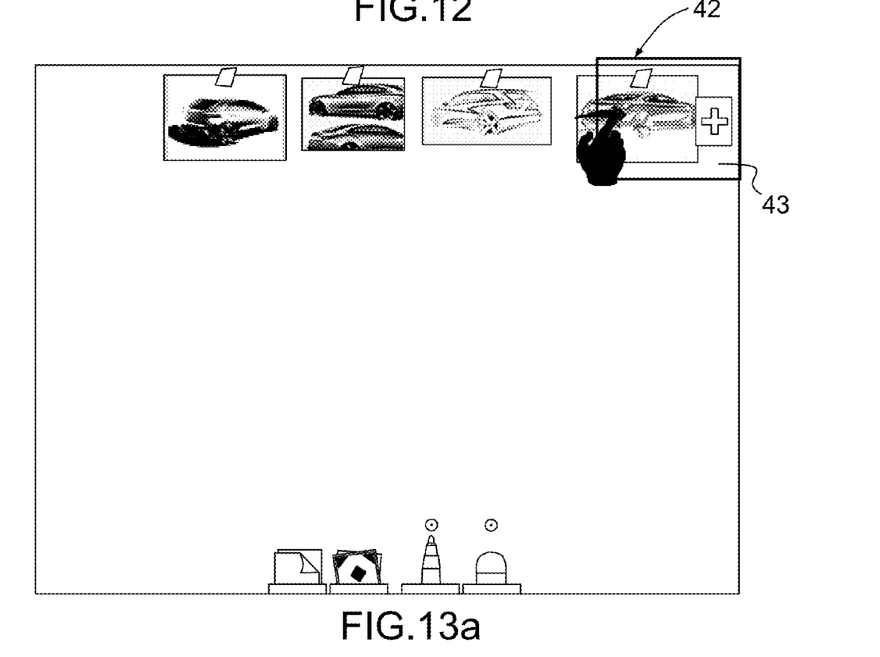
Figure 13B:
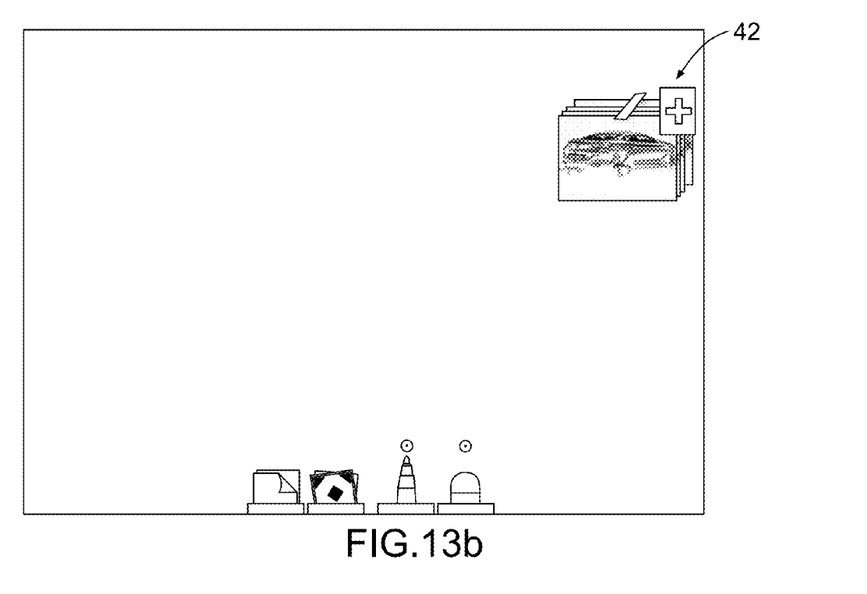

To switch back to previous mode (messy or stack), the user has to do a drag that stops in the first area 43, as illustrated on FIGS. 13a and 13b, in an example of an horizontal banner.

Figure 14:
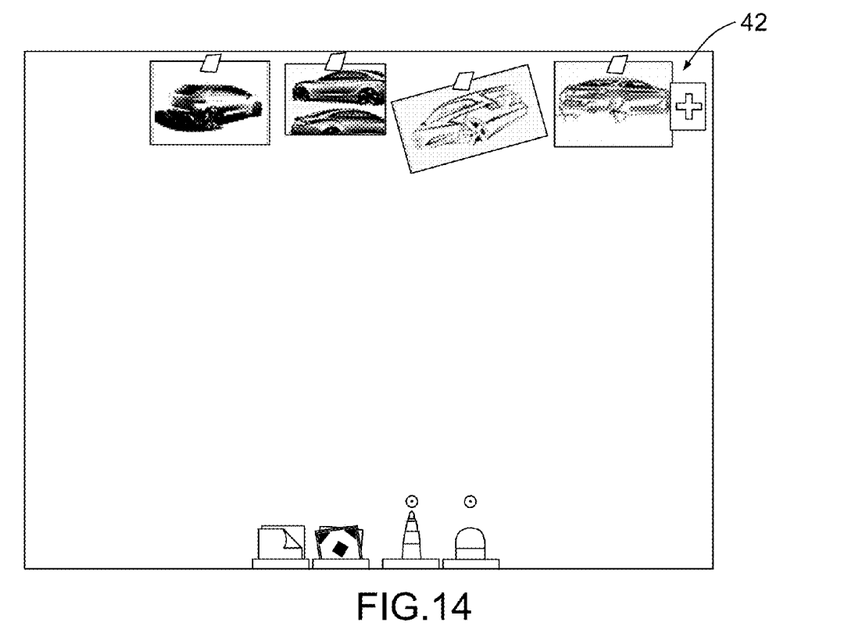

In all the representations, it is also possible to modify each image (scale, rotate, translate). An example of rotation and scaling is illustrated on FIG. 14.

To put an image in the 3D scene, the user only has to drag and drop an image of the graphical tool 42 in the screen, going out of a wide security area 54. The wide security area comprises the current area 43, 52, 53 of the graphical tool 42. The user can switch in and out the wide security area, but to be valid, the drop has to be outside the wide security area. The image is created at the drop position. Thus, the wide security area can be identical to the current size of the graphical tool, or comprise the current size of the graphical tool 42.

Figure 15A:
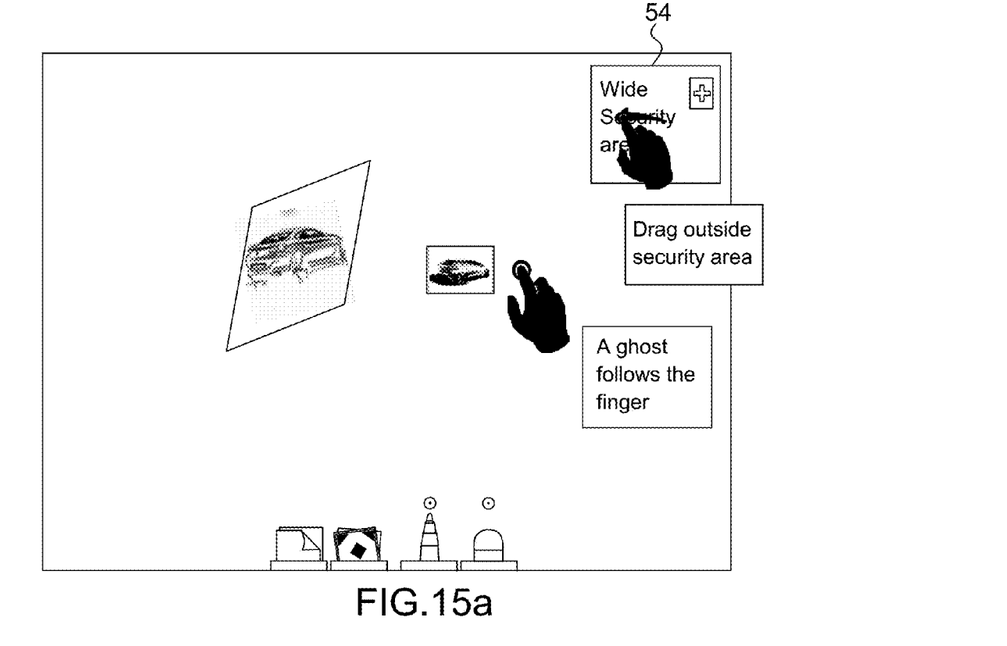
Figure 15B:
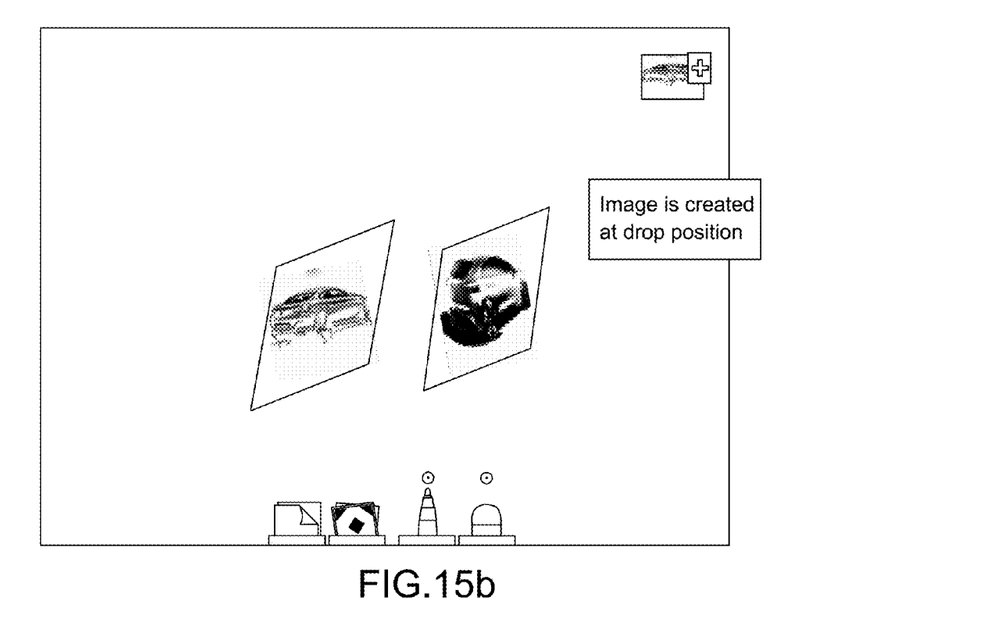

As represented on FIGS. 15a and 15b, during the manipulation, a "ghost" of the image, or in other words a representation of the imported image appears in partial transparency at the current position of the pointing element (finger, mouse, pen, . . . ) during the drag. The image is created at the drop position.

Figure 16:
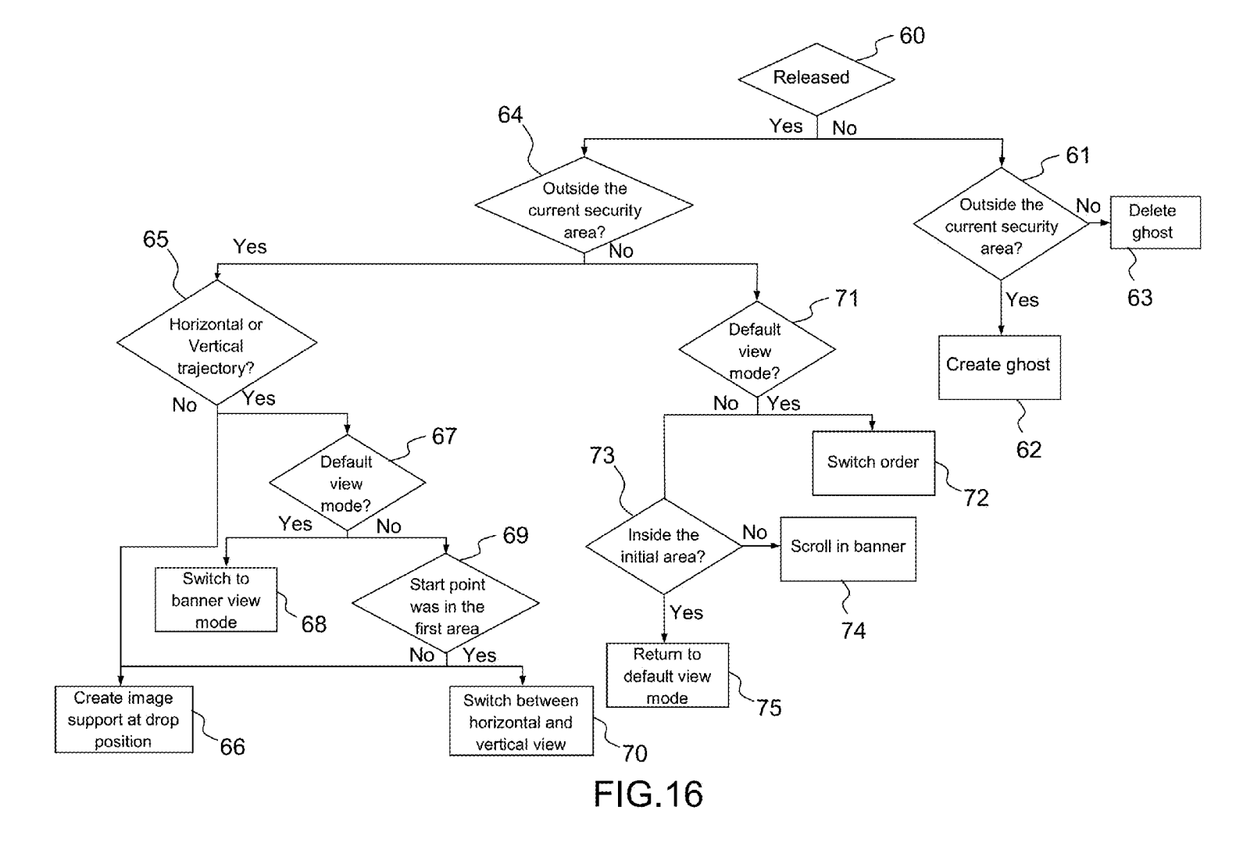

FIG. 16 represents an example of diagram representing a computer-implemented method according to an aspect of the invention, as previously disclosed.

A test 60 allows to know if the user releases or not the pointing element (finger, pen, mouse, . . . ).

If test 60 is negative (pointing element not released), a test 61 allows to know if the pointing element is outside the wide security area.

If test 61 is positive (pointing element outside the wide security area, in the designing scene 41), a ghost is created 62, i.e. a representation of the imported image appears in partial transparency at the current position of the pointing element (finger, mouse, pen, . . . ) during the drag.

If test 61 is negative, a ghost is deleted, or, not created 63.

If test 60 is positive (pointing element released), a test 64 allows to know if the pointing element is outside the wide security area.

If test 64 is positive (pointing element outside the wide security area, in the designing scene 41), a test 65 allows to know if the pointing element describes an horizontal or vertical trajectory.

If test 65 is negative, an image is create 66 at drop position, corresponding to the ghost image dragged.

If test 65 is positive, a test 67 allows to know if the graphical tool 42 is displayed in a default view mode, i.e. displayed in the first area 43.

If test 67 is positive (graphical tool 42 displayed in default view mode), then graphical tool 42 is displayed in the corresponding (horizontal or vertical) banner view mode 68 (respectively displayed in the second area 49 or third area 50).

If test 67 is negative (graphical tool 42 displayed in banner view mode), the drop is outside. A test 69 is effected to test if the origin of the trajectory is in the first area 43. If the origin of the trajectory is in the first area 43 the banner mode is switched 70 between horizontal and vertical. If not the image is created 66 in the 3D scene.

If test 64 is negative (pointing element inside the wide security area), a test 71 allows to know if the graphical tool 42 is displayed in a default view mode, i.e. displayed in the first area 43.

If test 71 is positive, then the order of images of the graphical tool 42 is modified 72, or, in other words, the order is switched.

If test 71 is negative, a test 73 allows to know if the pointing element is inside the initial area, or in other words inside the first area 43.

If test 73 is negative, a scroll 74 in horizontal or vertical banner is done.

If test 73 is positive, the method returns 75 to default view mode, i.e. the graphical tool in the first area 43.

Figure 17:
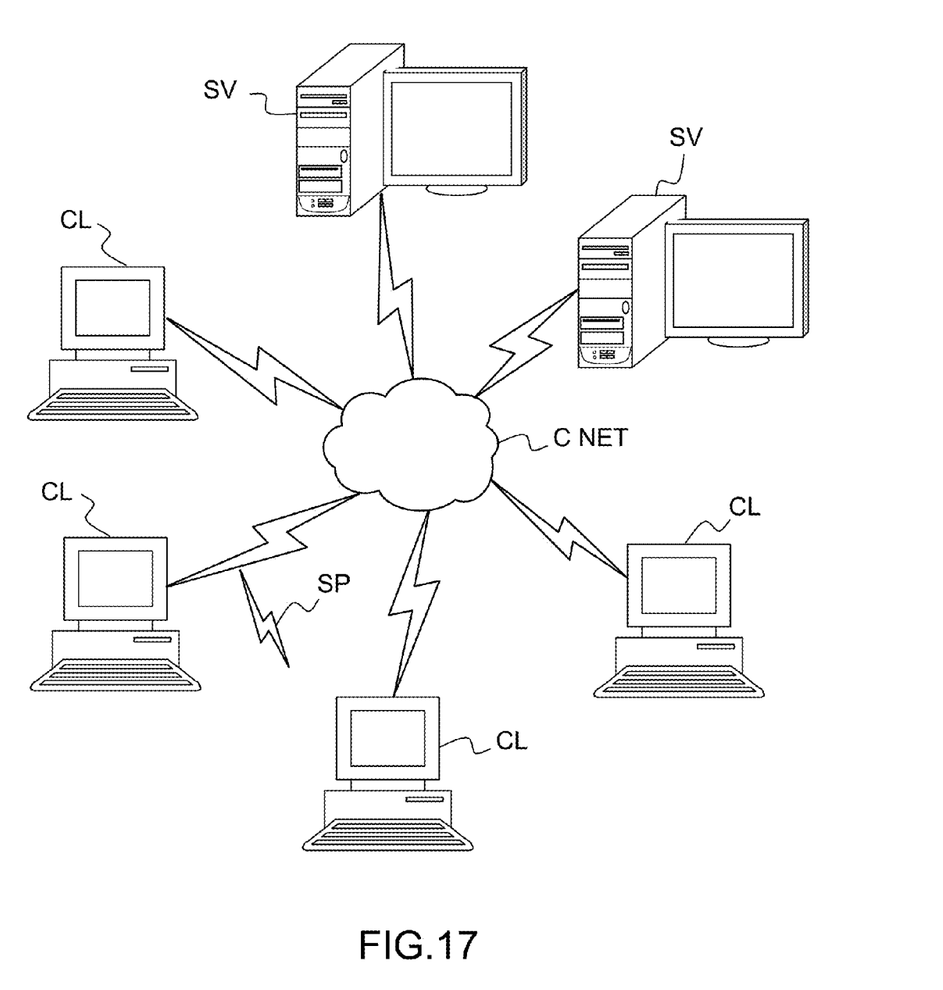
FIG. 17 illustrates a computer network or similar digital processing environment in which the present invention may be implemented.

FIG. 17 illustrates a computer network or similar digital processing environment in which the present invention may be implemented.

Client computer(s)/devices CL and server computer(s) SV provide processing, storage, and input/output devices executing application programs and the like. Client computer(s)/devices CL can also be linked through communications network CNET to other computing devices, including other client devices/processes CL and server computer(s) SV. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 18:
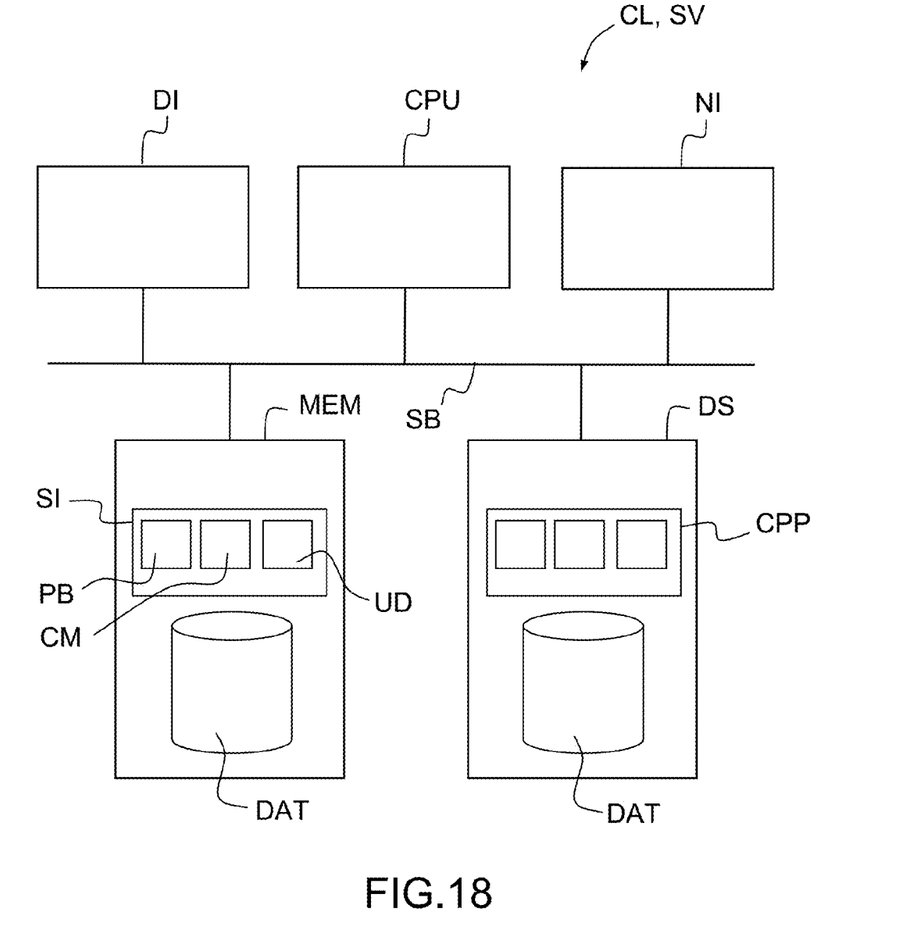
FIG. 18 illustrates a diagram of the internal structure of a computer.

FIG. 18 is a diagram of the internal structure of a computer (e.g., client processor/device CL or server computers SV) in the computer system of FIG. 17. Each computer CL, SV contains system bus SB, where a bus is a set of hardware lines used for data transfer among the components of a computer or processing system. Bus SB is essentially a shared conduit that connects different elements of a computer system (e.g., processor, disk storage, memory, input/output ports, network ports, etc. . . . ) that enables the transfer of information between the elements.

Attached to system bus SB is I/O device interface DI for connecting various input and output devices (e.g., keyboard, mouse, displays, printers, speakers, etc.) to the computer CL, SV. Network interface NI allows the computer to connect to various other devices attached to a network (e.g., network CNET of FIG. 17).

Memory MEM provides volatile storage for computer software instructions SI and data CPP used to implement an embodiment of the present invention (e.g., a first path builder PB, means CM for computing a second path, an updater UD implementing the method discussed in FIGS. 1 to 17, and supporting code detailed above).

Disk storage DS provides non-volatile storage for computer software instructions SI and data DAT used to implement an embodiment of the present invention. Central processor unit CPU is also attached to system bus SB and provides for the execution of computer instructions.

In one embodiment, the processor routines SI and data DAT are a computer program product (generally referenced CPP), including a computer readable medium (e.g., a removable storage medium such as one or more DVD-ROM's, CD-ROM's, diskettes, tapes, etc. . . . ) that provides at least a portion of the software instructions for the invention system. Computer program product CPP can be installed by any suitable software installation procedure, as is well known in the art.

In another embodiment, at least a portion of the software instructions may also be downloaded over a cable, communication and/or wireless connection. In other embodiments, the invention programs are a computer program propagated signal product SP embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program CPP.

In alternate embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer.

In another embodiment, the computer readable medium of computer program product CPP is a propagation medium that the computer system CL may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing a three-dimensional modeled object in a computer aided design (CAD) system comprising the steps of:
    displaying a three-dimensional designing scene (41) on a display screen (40) of the CAD system;
    displaying a graphical tool (42) in a first area (43) with a reduced size in a display area (44) of the display screen (40) of the CAD system, the graphical tool comprising at least one image (45, 46, 47) being permanently superimposed over the scene (41);
    when the graphical tool (42) comprises a number of images inferior or equal to a threshold, displaying the number of images partially superimposed such that 20% or less of the surface of each image is hidden; and
    when the graphical tool (42) comprises a number of images greater than or equal to a threshold, displaying the number of images by arranging the number of images in a stack.

2. The computer-implemented method of claim 1, wherein said reduced size of the first area (43) represents less than a quarter of the display area (44) of the screen (40).

3. The computer-implemented method of claim 2, wherein said reduced size of the first area (43) represents a sixth of the display area (44) of the screen (40).

4. The computer-implemented method of claim 1, wherein images are messy arranged.

5. The computer-implemented method of claim 1, wherein an image is scaled, rotated, or translated in the graphical tool (42).

6. The computer-implemented method of claim 1, wherein an image is added or deleted in the graphical tool (42).

7. The computer-implemented method of claim 1, wherein an image of the graphical tool (42) is imported in the scene (41), or an image of the scene (41) is exported in the graphical tool (42).

8. A computer-implemented method for designing a three-dimensional modeled object in a computer aided design (CAD) system comprising the steps of:
- displaying a three-dimensional designing scene (41) on a display screen (40) of the CAD system;
- displaying a graphical tool (42) in a first area (43) with a reduced size in a display area (44) of the screen (40) of the CAD system, the graphical tool comprising at least one image (45, 46, 47) and being permanently superimposed over the scene (41);
- importing an image of the graphical tool (42) in the scene (41) wherein, an importation in the scene (41) of an image of the graphical tool (42) being effected with a drag and drop of the image, a drop is not taken into account when made inside a wide security area comprising the current area (43, 52, 53) of the graphical tool (42).

9. The computer-implemented method of claim 8, wherein, during the drag in the scene (41), outside the wide security area, a representation of the imported image is represented in partial transparency at the current position of the drag.

10. The computer-implemented method of claim 9, wherein, at the end of the drag, at the drop position, the image is created in the scene (41) at the drop position.

11. A computer program product comprising:
- a non-transitory computer readable medium, for designing a three-dimensional modeled object in a computer aided design (CAD) system;
- computer-executable instructions embodied on the computer readable medium including code means for causing a computer system to:
- display a three-dimensional designing scene (41) on a display screen (40) of the CAD system;
- display a graphical tool (42) in a first area (43) with a reduced size in the display area (44) of the screen (40) of the CAD system, the graphical tool comprising at least one image (45, 46, 47) and being permanently superimposed over the scene (41);
- when the graphical tool (42) comprises a number of images inferior or equal to a threshold, display the number of images partially superimposed such that 20% or less of the surface of each image is hidden; and
- when the graphical tool (42) comprises a number of images greater than or equal to a threshold, display the number of images by arranging the number of images in a stack.

12. An apparatus for designing a three-dimensional modeled object in a computer aided design (CAD) system comprising:
- a processor; and
- a memory operatively coupled to the processor in a manner supporting designing a three-dimensional modeled object by instructing the processor to:
- display a three-dimensional designing scene (41) in a display screen (40) of the CAD system;
- display a graphical tool (42) in a first area (43) with a reduced size in the display area (44) of the screen (40) of the CAD system, the graphical tool comprising at least one image (45, 46, 47) and being permanently superimposed over the scene (41);
- when the graphical tool (42) comprises a number of images inferior or equal to a threshold, display the number of images partially superimposed such that 20% or less of the surface of each image is hidden; and
- when the graphical tool (42) comprises a number of images greater than or equal to a threshold, display the number of images by arranging the number of images in a stack.

13. The apparatus as claimed in claim 12 wherein said reduced size of the first area (43) represents less than a quarter of the display area (44) of the screen (40).

14. The apparatus as claimed in claim 12 wherein images are one of: arranged in a stack, and messy arranged.

15. The apparatus as claimed in claim 12 wherein the graphical tool is extended in a second area (52), the second area being one of: an horizontal banner in the display area (44), and a vertical banner in the display area.

16. The apparatus as claimed in claim 12 wherein images are any one or combination of:
- scrolled in a banner,
- scaled, rotated, or translated in the graphical tool, and
- added or deleted in the graphical tool.

17. The apparatus as claimed in claim 12 wherein an image of the graphical tool is imported in the scene, or an image of the scene is exported in the graphical tool.

18. A computer program product comprising:
- a non-transitory computer readable medium, for designing a three-dimensional modeled object in a computer aided design (CAD) system;
- computer-executable instructions embodied on the computer readable medium including code means for causing a computer system to:
- display a three-dimensional designing scene (41) on a display screen (40) of the CAD system;
- display a graphical tool (42) in a first area (43) with a reduced size in a display area (44) of the screen (40) of the CAD system, the graphical tool comprising at least one image (45, 46, 47) and being permanently superimposed over the scene (41);
- effect an importation in the scene (41) of an image of the graphical tool (42) with a drag and drop of the image, wherein a drop is not taken into account when made inside a wide security area comprising the current area (43, 52, 53) of the graphical tool (42).

19. An apparatus for designing a three-dimensional modeled object comprising:
- a processor; and
- a memory operatively coupled to the processor in a manner supporting designing a three-dimensional modeled object of a computer-aided design (CAD) system by instructing the processor to:
- display a three-dimensional designing scene (41) on a display screen (40) of the CAD system;
- display a graphical tool (42) in a first area (43) with a reduced size in a display area (44) of the screen (40) of the CAD system, the graphical tool comprising at least one image (45, 46, 47) and being permanently superimposed over the scene (41);
- effect an importation in the scene (41) of an image of the graphical tool (42) with a drag and drop of the image, wherein a drop is not taken into account when made inside a wide security area comprising the current area (43, 52, 53) of the graphical tool (42).

* * * * *